(12) United States Patent
Sakemoto et al.

(10) Patent No.: US 7,636,137 B2
(45) Date of Patent: Dec. 22, 2009

(54) DOUBLE-SIDED DISPLAY LIQUID CRYSTAL MODULE

(75) Inventors: Hiroki Sakemoto, Tottori (JP); Junichi Nakaomote, Matsumoto (JP); Michihiro Kubota, Azumino (JP)

(73) Assignee: Epson Imaging Devices Corporation, Nagano (JP)

( * ) Notice: Subject to any disclaimer, the term of this patent is extended or adjusted under 35 U.S.C. 154(b) by 217 days.

(21) Appl. No.: 11/651,496

(22) Filed: Jan. 10, 2007

(65) Prior Publication Data

US 2007/0229724 A1 Oct. 4, 2007

(30) Foreign Application Priority Data

Mar. 29, 2006 (JP) .............................. 2006-090369

(51) Int. Cl.
*G02F 1/1333* (2006.01)
(52) U.S. Cl. .......................................... 349/60; 349/58

(58) Field of Classification Search .............. 349/58–60
See application file for complete search history.

(56) References Cited

U.S. PATENT DOCUMENTS 6,741,301 B2 * 5/2004 Tsuji ........................... 349/58

FOREIGN PATENT DOCUMENTS

JP 2003-207801 7/2003
JP 2003-330377 A 11/2003

* cited by examiner

*Primary Examiner*—Dung T. Nguyen
(74) *Attorney, Agent, or Firm*—McDermott Will & Emery LLP

(57) ABSTRACT

A metallic back case (40) arranged on the back side of a main liquid crystal panel (20) included in a double-sided display liquid crystal module has an opening (42) that corresponds to a sub liquid crystal panel (60). A resin frame (50) is removably fitted in the opening (42), and the sub liquid crystal panel (60) is fitted to the resin frame (50). Thus, the sub liquid crystal panel (60) is kept out of direct contact with the back case (40).

2 Claims, 3 Drawing Sheets

DOUBLE-SIDED DISPLAY LIQUID CRYSTAL MODULE

This application is based on Japanese Patent Application No. 2006-090369 filed on Mar. 29, 2006, the contents of which are hereby incorporated by reference.

BACKGROUND OF THE INVENTION

1. Field of the Invention

The present invention relates to a liquid crystal module suitable for use in portable terminal devices such as mobile telephones and PDAs (personal digital assistants). More particularly, the present invention relates to a liquid crystal module suitable for use as a double-sided display module that allows display on both one and another side of a portable terminal device.

2. Description of Related Art

In recent years, portable terminal devices such as mobile telephones and PDAs have been widely available. Among these devices, mobile telephones, in particular, have become indispensable in our daily life because they provide not only their original telephone capabilities but also other capabilities such as digital camera capabilities and various Internet connection capabilities for e-mail, information searches, navigation, etc.

While mobile telephones are given increasingly high functionality in this way, on the hardware side also, increasingly high degrees of user-friendliness, light-weight and portability have been sought, resulting in development and commercialization of a wide variety of mobile telephones. For example, straight-type mobile telephones common in the past have now been largely superseded by flip-type mobile telephones popular these days.

Less recent models of flip-type mobile telephones were designed to be used in their unfolded state, and it is in this state that they display information. Thus, only one screen is needed for displaying information, and hence, among them, single-screen type mobile telephones are common. By contrast, more recent models of flip-type mobile telephones have come to be increasingly designed to display simple information, such as the caller's name and the current time even in their folded state. Hence, among them, double-screen type mobile telephones provided additionally with a subscreen are common.

As an example of a display module used in such a double-screen type mobile telephone, there is disclosed in patent document 1 listed below a double-sided display liquid crystal module.

FIG. 3 is an exploded perspective view of the double-sided display liquid crystal module disclosed in patent document 1. This double-sided display liquid crystal module is composed of: a main liquid crystal panel 71 that is used as a main display screen in a double-screen type mobile telephone; a holder 72 for holding the main liquid crystal panel 71; a backlight 73 made up of a light guide plate, an optical sheet and other components; a flexible substrate 74; and a sub liquid crystal panel 76 that is used as a subscreen in the double-screen type mobile telephone.

Disadvantageously, however, if the double-sided display liquid crystal module described above is, as it is, housed in the display housing of a mobile telephone, the flexible substrate 74, which is simply placed on the backlight 73, remains completely exposed. Thus, the circuit pattern formed on the flexible substrate 74 and the circuit components mounted thereon are prone to collect dust and the like, and may even be damaged under an impact.

As an improvement, there is disclosed in patent document 2 listed below a liquid crystal module structured as follows. In this liquid crystal module, a main liquid crystal panel located in an upper part thereof and a flexible substrate located on the back side of the main liquid crystal panel are covered from below by a back case formed of a metal plate; the back case has an opening formed therein that corresponds to a sub liquid crystal panel, and the sub liquid crystal panel is directly arranged from below so as to close the opening.

Patent document 1: JP-A-2003-330377 (FIG. 2; paragraphs 0006, 0007 and 0032 to 0034)

Patent document 2: JP-A-2003-207801 (FIG. 3; paragraphs 0013 to 0019)

As compared with the liquid crystal module disclosed in patent document 1, where the flexible substrate is exposed inside the mobile telephone, the liquid crystal module disclosed in patent document 2 is suitable for use as a liquid crystal module in a mobile telephone for the following reasons, among others: in mobile telephones, which are carried around by users and used under various environments, the flexible substrate can be protected by the back case; the back case formed of metal can enhance the strength of the double-sided display liquid crystal module; the metallic back case can shield the liquid crystal module from the noise that is emitted from inside and outside the liquid crystal module.

Inconveniently, however, with a back case formed of a metal plate as disclosed in patent document 2, it is difficult to keep its surface flat. If the back case is insufficiently flat around the opening where the sub liquid crystal panel is directly fitted, it is impossible to stably fit the sub liquid crystal panel therein. To be sure, the sub liquid crystal panel and the back case are fixed together with double-sided tape, adhesive or the like, but even then, if the back case is severely distorted, insufficient adhesion results.

Moreover, with a back case formed of a metal plate, when it is worked on, it is highly likely to form burrs around the opening. Such burrs scratch and damage the sub liquid crystal panel when it is fitted.

Furthermore, since the back case is formed of a single metal plate, when, for example, the double-sided display liquid crystal module is distorted under an impact or the like, the distortion in the back case, to which the sub liquid crystal panel is integrally fitted, passes on directly to the sub liquid crystal panel, and thus the sub liquid crystal panel is highly likely to be broken or otherwise damaged.

As portable terminal devices such as mobile telephones, in particular, are made increasingly compact and slim, the disadvantages described above continue to grow in double-sided display liquid crystal modules.

It is therefore an object of the present invention to provide a compact double-sided display liquid crystal module in which the above-mentioned disadvantages encountered when a sub liquid crystal panel is fitted in a metallic back case have been overcome to realize an optimal double-sided display liquid crystal module used in a portable terminal device.

SUMMARY OF THE INVENTION

According to the present invention, a double-sided display liquid crystal module including a main liquid crystal panel and a sub liquid crystal panel is characterized in that a metallic back case arranged on the back side of the main liquid crystal panel has an opening formed therein so as to correspond to the sub liquid crystal panel, the opening is fitted with a removable frame member, and the sub liquid crystal panel is fitted to the frame member. With this structure, it is possible to prevent the sub liquid crystal panel from making direct contact with the back case.

According to the present invention, there is provided a double-sided display liquid crystal module characterized in that a recessed portion that extends horizontally is formed in the opening, a projecting portion that extends horizontally is formed in the frame member, and the recessed portion fits into the projecting portion to permit the frame member to be removably arranged in the opening.

According to the present invention, there is provided a double-sided display liquid crystal module characterized in that a wall portion that extends away from the main liquid crystal panel is formed at the opening, and an overhang portion that covers the wall portion is formed in the frame member.

With the structure of the present invention, in a double-sided display liquid crystal module that is provided with a metallic back case on the back side of a main liquid crystal panel, it is possible to keep the sub liquid crystal panel fitted in the back case while maintaining the flatness of the sub liquid crystal panel. Moreover, even if burrs form on the metallic back case, the sub liquid crystal panel is unlikely to be damaged by the burr. Further, even if the back case is distorted under an external force or the like, the frame member absorbs some of the force. This makes it possible to prevent the sub liquid crystal panel from being broken.

Furthermore, even if the sub liquid crystal panel receives an external force acting to push it toward the main liquid crystal panel, since the overhang portion is supported by the wall portion, the sub crystal panel can be kept in place.

DETAILED DESCRIPTION OF PREFERRED EMBODIMENTS

A liquid crystal module according to the present invention is characterized in that a metallic back case is arranged on the back side of a main liquid crystal panel included in a double-sided display liquid crystal module, that the back case has an opening formed therein so as to correspond to a sub liquid crystal panel, that a frame member is removably arranged in the opening and that the sub liquid crystal panel is fitted to the frame member.

Hereinafter, a preferred embodiment of the present invention will be described with reference to the accompanying drawings. It should be noted that the following embodiment is merely illustrative of a double-sided display liquid crystal module embodying the technical sprit of the invention and is not intended to limit the invention to any specific embodiment, and that the present invention is equally applicable to any other embodiment that falls within the scope of the appended claims.

Figure 1:
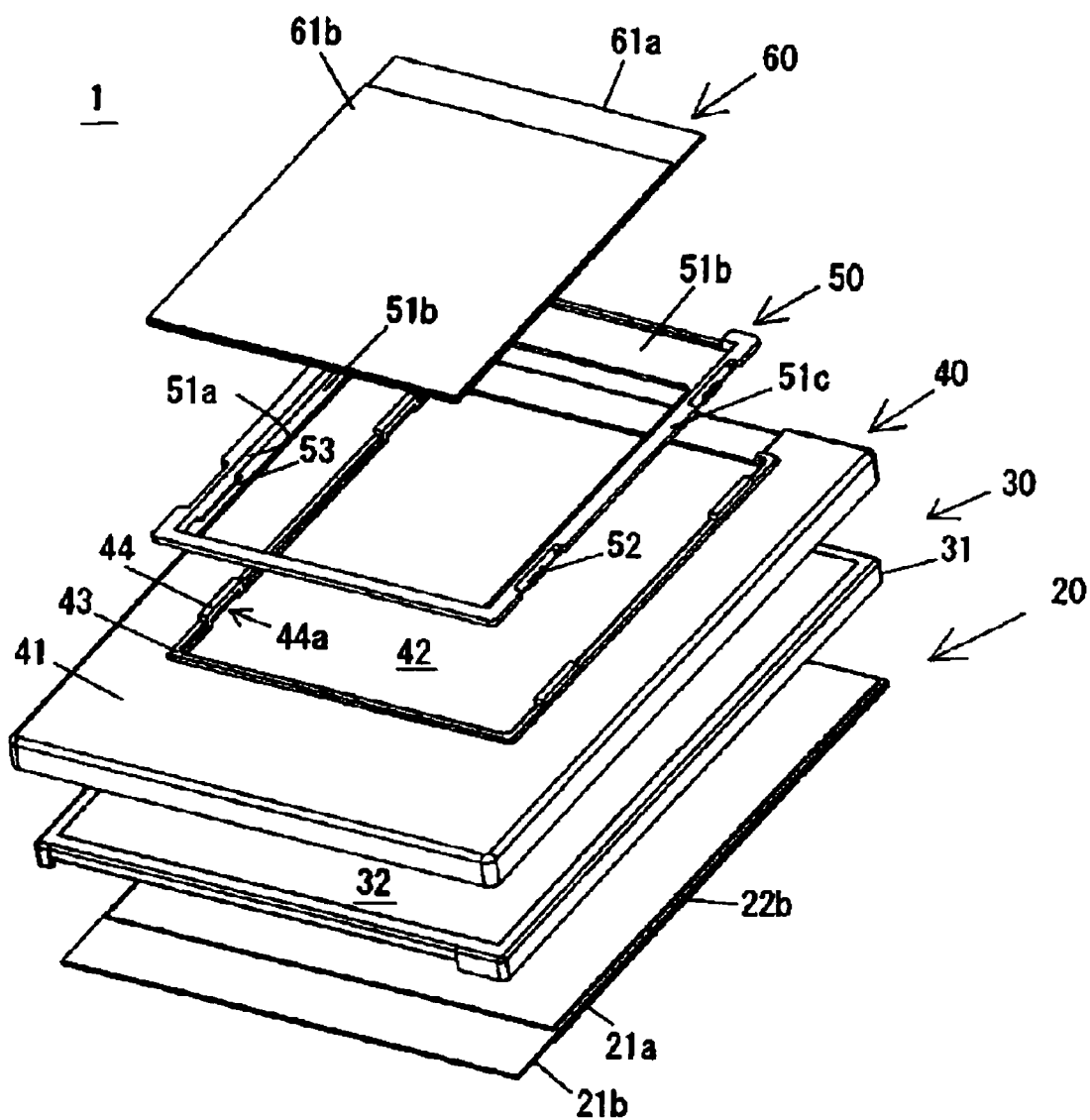
FIG. 1 is an exploded perspective view of a double-sided display liquid crystal module of the present invention, as seen from the side of a sub liquid crystal panel.
Figure 2A:
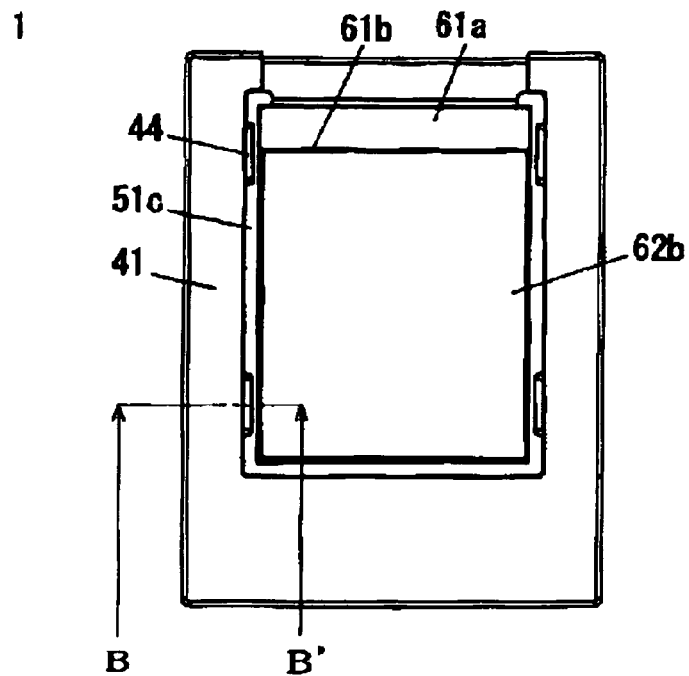
FIG. 2A is a plan view of the double-sided display liquid crystal module, as seen from the side of the sub liquid crystal panel.
Figure 2B:
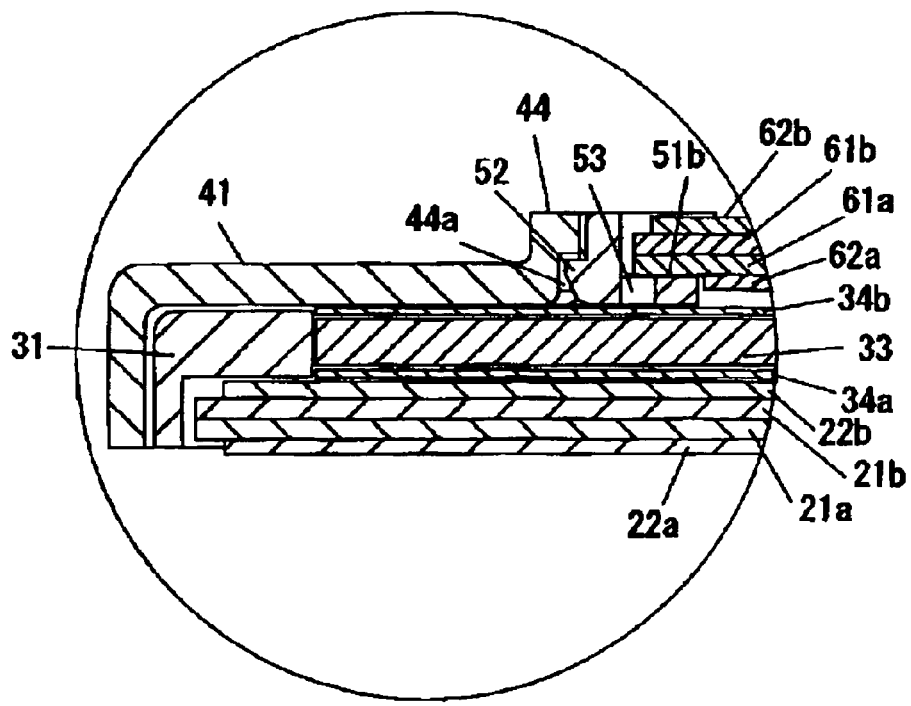
FIG. 2B is a cross-sectional view of the double-sided display liquid crystal module, taken along line B-B' of FIG. 2A.
Figure 3:
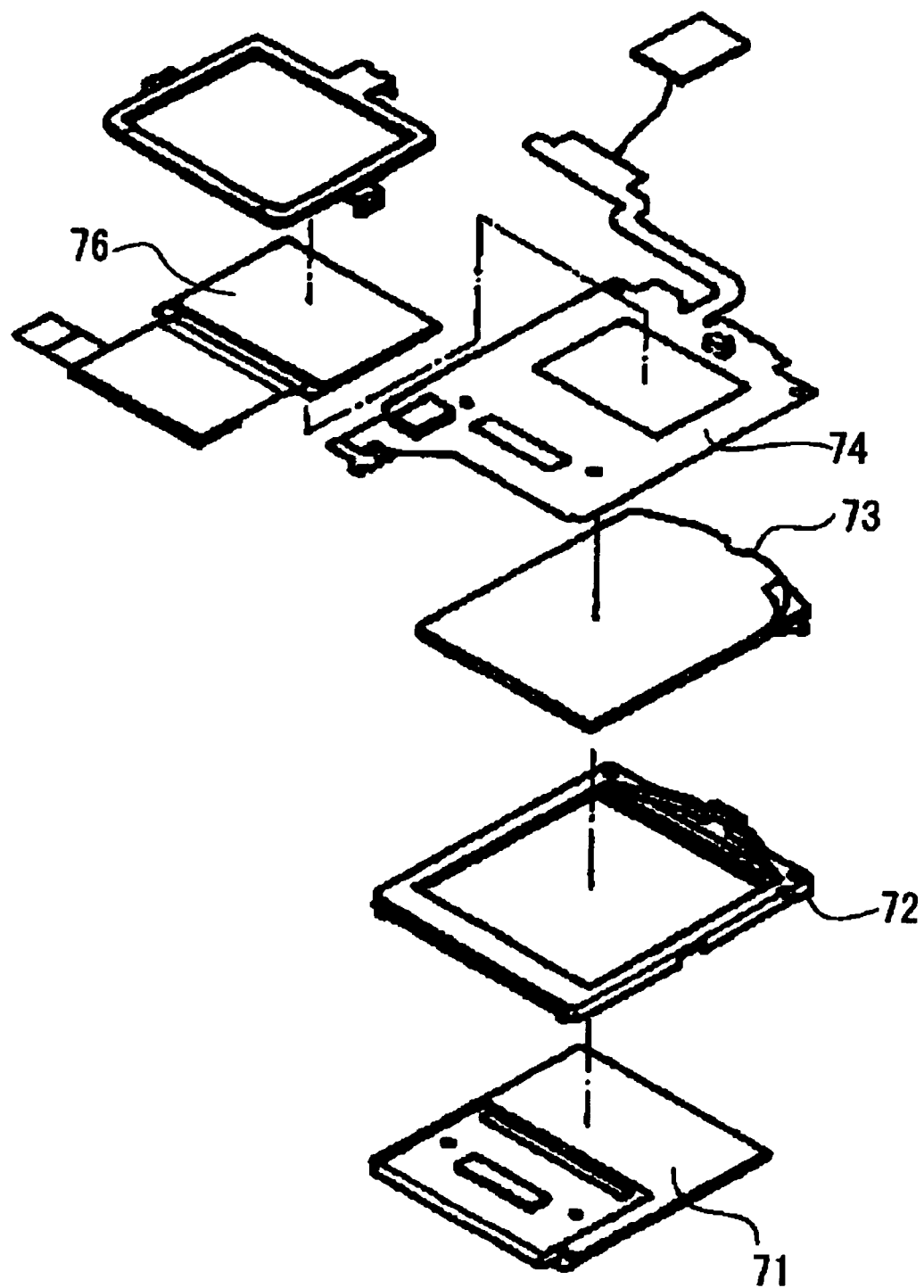
FIG. 3 is an exploded perspective view of a conventional double-sided display liquid crystal module.

FIG. 1 is an exploded perspective view of a double-sided display liquid crystal module of an embodiment of the present invention, as seen from the side of a sub liquid crystal panel. FIG. 2A is a plan view of the double-sided display liquid crystal module, as seen from the side of the sub liquid crystal panel. FIG. 2B is a cross-sectional view of the double-sided liquid crystal module, taken along line B-B' of FIG. 2A.

Reference numeral 1 in the embodiment represents a double-sided display liquid crystal module for use in a double-screen type mobile telephone. The double-sided display liquid crystal module 1 is composed of: a main liquid crystal panel 20; an inside frame 30 that supports the main liquid crystal panel 20; a back case 40 that covers the back side of the main liquid crystal panel 20 and the inside frame 30; a resin frame 50 that is fitted in an opening 42, which will be described later, formed in the back case 40; and a sub liquid crystal panel 60 that is located on the back side of the main liquid crystal panel 20 and that is firmly supported by the resin frame 50.

The main liquid crystal panel 20 is structured similarly to a typical liquid crystal panel by sandwiching liquid crystal (unillustrated) between a pair of glass substrates, namely first and second substrates 21a and 21b. On the sides of the first and second substrates 21a and 21b opposite from the sides thereof between which the liquid crystal is sandwiched, polarizing plates 22a and 22b are fitted respectively.

The main liquid crystal panel 20 has a display area and a frame area around the display area. In the display area, the first and second substrates 21a and 21b have scanning lines, video lines, switching devices, pixel electrodes, color filters (CF) and other components formed thereon, and various kinds of information are displayed on the area when a mobile telephone is in use. In the frame area that surrounds the display area, interconnections are formed that are connected to the scanning and video lines connected to the switching devices; in addition a sealing agent is applied to fit the substrates on the frame area and a driver (unillustrated) for display is arranged on the second substrate 21b.

The main liquid crystal panel 20 is provided with a main flexible substrate (unillustrated) that is connected to the second substrate 21b and that is folded onto the back side of the second substrate 21b. The main flexible substrate has various circuit components and the like formed thereon.

The inside frame 30 is formed of a frame-shaped base member 31 of plastic, and firmly supports the main liquid crystal panel 20. The inside frame 30 is provided with a backlight unit 32 in the space enclosed by the base member 31. The backlight unit 32 is composed of an unillustrated light source such as an LED, a single light guide plate 33, optical sheets 34a and 34b arranged on the front and rear sides of the light guide plate 33 respectively and other components.

The light guide plate 33 is formed of a thin plate-shaped member about 0.6 mm thick. The light guide plate 33 takes in, through one end thereof, light emitted from the light source and then directs the light to the front and back sides of the light guide plate 33. The light guide plate 33 is formed of a transparent material such as acrylic resin.

The optical sheets 34a and 34b are each formed of a plurality of different types of sheets, such as diffusing sheets and prism sheets, stacked on top of one another; in FIG. 2B, however, only one sheet is shown for each of the stacked sheets. The optical sheets 34a and 34b are mainly used for display on the main liquid crystal panel 20 and the sub liquid crystal panel 60 respectively.

The back case 40 is arranged on the back side of the main liquid crystal panel 20, and is formed to be box-shaped to firmly accommodate the main liquid crystal panel 20 and the inside frame 30. The back case 40 is formed by working on and shaping a metal sheet of metallic material such as aluminum, stainless steel or magnesium.

In the box-shaped bottom portion 41 of the back case 40, a rectangular opening 42 is formed that is slightly larger than the sub liquid crystal panel 60. Around the opening 42, a wall portion 43 is formed along three sides of the opening 42 so as to extend in a direction that points perpendicularly away from the main liquid crystal panel 20. The height of the wall portion 43 is slightly greater than the thickness of the sub liquid crystal panel 60.

With this structure, the double-sided display liquid crystal module 1 has a thickness as small as possible in the area around the sub liquid crystal panel 60. Whereas the wall portion 43 is formed along three sides of the opening 42, on the other side thereof along which the wall portion 43 is not formed, a sub flexible substrate, which will be described later, is arranged that is connected to the sub crystal liquid panel 60.

Among the three sides at which the wall portion 43 is formed, the opposite two sides each have two connecting portions 44 formed therein. The connecting portions 44 each have a recessed portion 44a that extends horizontally. The number of connecting portions 44 provided at each side is not limited to two, but may be more than two, or one. Connecting portions 44 may be formed on all the three sides.

The resin frame 50 is a frame member that is removably fitted to the back case 40, and is formed of plastic or resin such as acrylic. The resin frame 50 prevents the sub liquid crystal panel 60 from making direct contact with the back case 40.

The resin frame 50 has a side wall portion 51a that is substantially in contact with the rim of the opening 42 in the back case 40 and that extends vertically downward. The resin frame 50 also has a floor portion 51b that extends inward of the resin frame 50 from one side (the side facing the main liquid crystal panel 20) of the side wall portion 51a. Moreover, the resin frame 50 has an overhang portion 51c that extends outward of the resin frame 50 from the opposite side (the side facing away from the main liquid crystal panel 20) of the side wall portion 51a.

The floor portion 51b is a portion on which the sub liquid crystal panel 60 rests, and is formed within the frame area of the sub crystal liquid panel 60. The side wall portion 51a and the floor portion 51b together firmly support the sub liquid crystal panel 60. To firmly support the sub liquid crystal panel 60, double-sided tape or adhesive may be used between the sub liquid crystal panel 60 and the resin frame 50.

The overhang portion 51c is so formed as to cover the wall portion 43 of the back case 40. With this structure, the overhang portion 51c is supported by the wall portion 43 when an external force is applied from the direction of the sub liquid crystal panel 60. Thus, it is possible to prevent the sub liquid crystal panel 60 from being abruptly displaced toward the main liquid crystal panel 20.

On the wall portion 51a, projecting portions 52 are formed that correspond to the connecting portions 44 of the back case 40 and that extend horizontally. By fitting the projecting portions 52 into the recessed portions 44a, it is possible to removably fit the resin frame 50 to the back case 40. On the back side of the projecting portions 52, where the sub liquid crystal panel 60 is fitted, gaps 53 are formed in the floor portion 51b. The gaps 53 are formed along the connecting portions 44. Forming the gaps makes the projecting portions 52 resilient so that the projecting portions 52 are movable horizontally. This makes it possible to easily fit the projecting portions 52 into the recessed portions 44a.

The structure of the sub liquid crystal panel 60 is basically similar to that of the main liquid crystal panel 20. The sub liquid crystal panel 60 is structured by sandwiching liquid crystal (unillustrated) between a pair of glass substrates, namely first and second substrates 61a and 61b. On the sides of the first and second substrates 61a and 61b opposite from the sides thereof between which the liquid crystal is sandwiched, polarizing plates 62a and 62b are fitted respectively. In FIG. 1, the polarizing plate 62b is not illustrated. The sub liquid crystal panel 60 is provided with a sub flexible substrate (unillustrated) that is connected to the first substrate 61a, and the sub flexible substrate is inserted into a connector formed on the main flexible substrate.

Hereinafter, a method of assembling the double-sided display liquid crystal module 1 will be described by way of an example.

First, the backlight unit 32 is fitted to the inside frame 30.

Next, the main liquid crystal panel 20 is firmly supported with the inside frame 30. Here, the main flexible substrate that is connected to the main liquid crystal panel 20 is folded onto the back side of the inside frame 30.

Next, the sub liquid crystal panel 60 is firmly supported with the resin frame 50. The resin frame 50 can be molded with a mold; it can thus be easily formed with an extremely high flatness. In contrast, a metallic back case is prone to be deformed under an impact even after being molded. Thus, as opposed to when the sub liquid crystal panel 60 is directly fixed with the metallic back case 40, the sub liquid crystal panel 60 can be firmly supported with the resin frame 50 with an extremely high flatness.

Next, the sub liquid crystal panel 60 and the resin frame 50 fitted together are fitted to the back case 40. This is achieved by fitting the projecting portions 52 of the resin frame 50 into the recessed portions 44a of the back case 40. In this way, instead of fitting the sub liquid crystal panel 60 directly to the back case 40, the sub liquid crystal panel 60 is fixed to the back case 40 with the resin frame 50 interposed therebetween. Thus, even if the back case 40 has a burr, the sub liquid crystal panel 60 is kept out of contact with the back case 40 and hence the sub liquid crystal panel 60 is prevented from being damaged by the burr.

Then, the sub flexible substrate that is connected to the sub liquid crystal panel 60 is folded from outside to inside the back case 40 along the side of the back case 40 where the wall portion 43 is not provided.

Next, the sub flexible substrate is connected, via a connector, to the main flexible substrate that is folded onto the back side of the inside frame 30. Then, the main liquid crystal panel 20 and the inside frame 30 are accommodated in the back case 40 fitted with the sub liquid crystal panel 60 and the resin frame 50. Now the double-sided display liquid crystal module 1 is complete.

Here, the sub liquid crystal panel 60 is not fitted directly to the back case 40, but is fitted to the back case 40 with the resin frame 50 interposed therebetween. Thus, even if an external force is applied to the double-sided display liquid crystal panel and thus the back case 40 is distorted or otherwise deformed, the resin frame 50 interposed between the sub liquid crystal panel 60 and the back case 40 can absorb some of the force. This makes it possible to reduce the risk of the sub liquid crystal panel being broken.

The double-sided display liquid crystal module 1 assembled as described above is incorporated in a double-screen type mobile telephone. Specifically, the double-sided display liquid crystal module 1 is housed inside the housing of a mobile telephone, and is connected to a flexible substrate that runs from the main control substrate of the mobile telephone. As various signals are inputted into the double-sided display liquid crystal module 1, various kinds of information are displayed thereon. When the mobile telephone is in its folded state, display is made on the sub liquid crystal panel that shows through the housing of the mobile telephone; when the mobile telephone is in its unfolded state, display is made on the main liquid crystal panel 20 that shows through the housing of the mobile telephone.

The double-sided display liquid crystal module 1 described above finds application not only in mobile telephones, but can be applied also to other double-screen type portable terminal devices such as PDAs.

What is claimed is:

1. A double-sided display liquid crystal module including a main liquid crystal panel and a sub liquid crystal panel, wherein
    a metallic back case arranged on a back side of the main liquid crystal panel has an opening formed therein so as to correspond to the sub liquid crystal panel,
    the opening is fitted with a removable frame member,
    the sub liquid crystal panel is fitted to the removable frame member,
    the removable frame member prevents the sub liquid crystal panel from making direct contact with the back case,
    a recessed portion that extends horizontally is formed in the opening,
    a projecting portion that extends horizontally is formed in the removable frame member, and
    the recessed portion fits into the projecting portion to permit the removable frame member to be removably arranged in the opening.

2. A double-sided display liquid crystal module including a main liquid crystal panel and a sub liquid crystal panel, wherein
    a metallic back case arranged on a back side of the main liquid crystal panel has an opening formed therein so as to correspond to the sub liquid crystal panel,
    the opening is fitted with a removable frame member,
    the sub liquid crystal panel is fitted to the removable frame member,
    the removable frame member prevents the sub liquid crystal panel from making direct contact with the back case,
    a wall portion that extends away from the main liquid crystal panel is formed at the opening, and
    an overhang portion that covers the wall portion is formed in the removable frame member.

* * * * *